(12) United States Patent
Calabrese et al.

(10) Patent No.: US 7,357,310 B2
(45) Date of Patent: Apr. 15, 2008

(54) MOBILE PHONE CHARGE CARD NOTIFICATION AND AUTHORIZATION METHOD

(76) Inventors: Gerry Calabrese, 15951 SW. 41st St., Suite 600, Fort Lauderdale, FL (US) 33331; Werner Stemer, 1008 SW. 5th Pl., Fort Lauderdale, FL (US) 33312

(*) Notice: Subject to any disclaimer, the term of this patent is extended or adjusted under 35 U.S.C. 154(b) by 2 days.

(21) Appl. No.: 11/077,783

(22) Filed: Mar. 11, 2005

(65) Prior Publication Data
US 2006/0202025 A1 Sep. 14, 2006

(51) Int. Cl.
*G06K 5/00* (2006.01)
(52) U.S. Cl. ........................ 235/380; 235/383
(58) Field of Classification Search .............. 235/379, 235/380, 383; 705/64, 75
See application file for complete search history.

(56) References Cited
U.S. PATENT DOCUMENTS

| | | | | |
|---|---|---|---|---|
| 5,221,838 A | * | 6/1993 | Gutman et al. | 235/379 |
| 5,359,182 A | * | 10/1994 | Schilling | 235/380 |
| 5,521,363 A | * | 5/1996 | Tannenbaum | 235/379 |
| 6,366,893 B2 | * | 4/2002 | Hannula et al. | 705/40 |
| 6,442,532 B1 | * | 8/2002 | Kawan | 705/36 R |
| 6,494,367 B1 | * | 12/2002 | Zacharias | 235/382 |
| 6,726,098 B2 | * | 4/2004 | Schilling | 235/380 |
| 6,754,636 B1 | * | 6/2004 | Walker et al. | 705/26 |
| 7,024,396 B2 | * | 4/2006 | Woodward | 705/71 |
| 7,181,432 B2 | * | 2/2007 | Wells et al. | 705/64 |
| 2002/0035539 A1 | * | 3/2002 | O'Connell | 705/39 |
| 2002/0107755 A1 | * | 8/2002 | Steed et al. | 705/26 |
| 2002/0107791 A1 | * | 8/2002 | Nobrega et al. | 705/39 |

* cited by examiner

*Primary Examiner*—Ahshik Kim

(57) ABSTRACT

An added level of security is added to charge card transactions. Upon presenting a credit card for a purchase, for example, the cardholder receives a message on his cell phone that a charge authorization request has been received. The cardholder may also be prompted to reply with a password or a PIN, so as to add a second security authorization.

4 Claims, 2 Drawing Sheets

MOBILE PHONE CHARGE CARD NOTIFICATION AND AUTHORIZATION METHOD

BACKGROUND OF THE INVENTION

Field of the Invention

The invention lies in the financial transaction processing field. More specifically, the invention relates to credit and debit transactions and to related charge notification and charge authorization.

Credit cards and charge cards have become the primary vehicle by which payments for consumer services and consumer goods are transacted. In today's environment, credit payments are authorized at the point of sale (POS) and the authorization is provided by the cardholder's signature on a receipt. Often, the transaction is performed under considerable time pressure (e.g., in a long cash-out line) and mistakes are only recognized after the transaction has been completed. The consumer may, for example, have been charged too much, and he may have authorized the incorrect amount. As many consumers know, correcting such simple mistakes is not at all simple and the correction is time consuming and it is an expensive service for the credit card and credit clearing houses to maintain.

Mistakes such as the foregoing, however, are not the main reason for considerable losses. Often, incorrect or non-authorized charges are effected because of fraudulent or even innocent mistakes that could have been avoided, had better authorization security been assured. It is well known that charge errors and charge fraud causes millions of dollars in losses in the United States alone.

Extraneous authorization security, on the other hand, may be too intrusive in many cases and may even have a negative impact on the transaction.

SUMMARY OF THE INVENTION

It is accordingly an object of the invention to provide a credit card transaction notification and authorization method, which overcomes the above-mentioned disadvantages of the heretofore-known devices and methods of this general type and which provides for a non-intrusive, user-selectable notification and authorization system for credit card transactions.

With the foregoing and other objects in view there is provided, in accordance with the invention, a payment authorization method, which comprises:

gathering, at a merchant's, account information for payment of a customer's purchase;

transmitting an authorization request to a financial authorization system requesting payment authorization for the customer's purchase, the authorization request including the account information;

notifying the customer by sending a message to a wireless device carried upon the customer.

In accordance with an added feature of the invention, the gathering step comprises swiping a card presented by the customer and containing the account information.

With the above and other objects in view there is also provided, in accordance with a second embodiment of the invention, a payment authorization method, which comprises:

gathering, at a merchant's, account information for payment of a customer's purchase;

transmitting an authorization request to a financial authorization system requesting payment authorization for the customer's purchase, the authorization request including the account information;

calling a wireless device associated with the customer and prompting the customer for confirmation or refusal of the transaction; and processing the authorization request in accordance with the customer's response by either refusing the transaction or processing the purchase.

In accordance with an alternative implementation of the invention the customer is required to enter their personal identifier (e.g., a PIN) upon being prompted. A proper PIN response is considered an authorization, while an incorrect PIN or no response at all is considered a refusal.

Other features which are considered as characteristic for the invention are set forth in the appended claims.

Although the invention is illustrated and described herein as embodied in a credit card transaction notification and authorization system, it is nevertheless not intended to be limited to the details shown, since various modifications and structural changes may be made therein without departing from the spirit of the invention and within the scope and range of equivalents of the claims.

The construction of the invention, however, together with additional objects and advantages thereof will be best understood from the following description of the specific embodiment when read in connection with the accompanying drawings.

DESCRIPTION OF THE PREFERRED EMBODIMENTS

Figure 1:
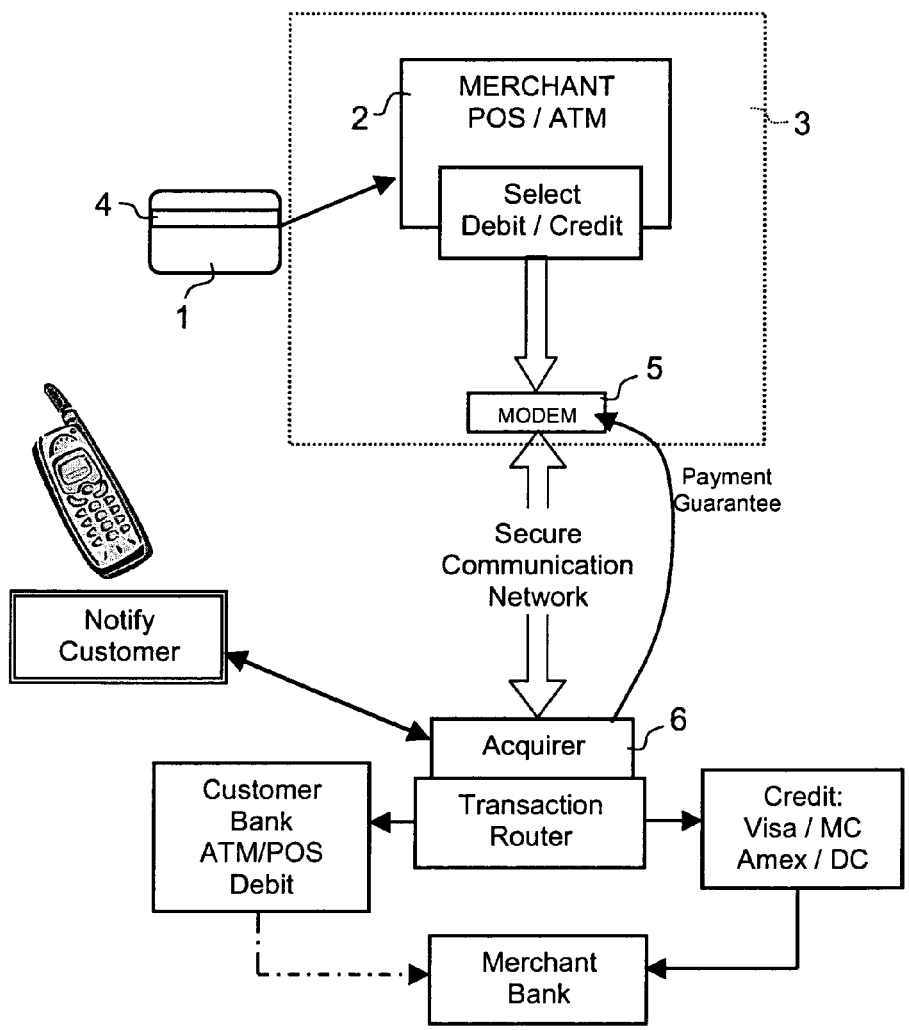
FIG. 1 is a schematic diagram illustrating a transaction according to the invention, in which the customer is notified immediately during the transaction.

Referring now to the figures of the drawing in detail and first, particularly, to FIG. 1 thereof, there is seen a simplified process stream in a cash-less sales transaction. A charge card 1 is swiped at a magnetic card reader 2 at a merchant terminal 3, or the card number is manually entered at the merchant terminal 3. The latter may represent a store, it may be a teller or an automated teller machine (ATM), or it may be a virtual terminal in an internet-type transaction. The cardholder, or the person swiping the card, may now be prompted to select a debit transaction or a credit transaction on the merchant terminal 3. If debit is selected, the cardholder enters the PIN associated with the card or with the account. If credit is selected, the cardholder is requested to sign for the purchase.

Prior to the customer's signing for the purchase, the merchant terminal 3 connects, through a modem 5, to an acquirer 6. The latter obtains the information from the modem 5 and checks against its data sources whether or not the transaction should be authorized. At the same time, a corresponding customer profile is checked as to the customer's set preferences concerning the notification/authorization options according to the invention.

Here, the customer's profile is set to simple "notification," which means that the system only notifies the cardholder by sending a message to his wireless device (e.g., cell phone). The message may be an audible message such as, for example, "% amount % charged on % date % at % merchant name %", or it may be an SMS (short message service) sent to the customer's phone. The customer's profile, however, may be set to any of several other options. For instance, the profile may be set to a simple notification, as above, followed by a prompt to confirm the purchase. The confirmation, again, may take any of several forms. For example, a simple "1" in answer to the confirmation request may be a code for authorization and a "2" may be a refusal. Or else, the customer may be prompted to enter a PIN or any set password which is stored in the customer profile. If the profile is set to authorization, the payment authorization and the payment guarantee are not provided. That is, the card transaction is declined at the merchant terminal 3.

The simple notification, of course, does not add any time to the transaction. If confirmation is required, the transaction is slightly extended. The added security, however, may well justify the delay. In either case, it is up to the customer to choose and set his profile accordingly.

The possible delay may be avoided by way of a further modification of the invention. Here, we provide for preauthorization when a charge request is imminent. By way of example: waiting in a checkout line, the customer may call "ahead" and provide preauthorization for the impending purchase. This may be entirely automated. The system will prompt the customer to identify a period of time for which the authorization is valid. For example, the purchase may be expected within 10 minutes and, accordingly, the customer will select, say, the half-hour authorization option. The system may also prompt for a maximum amount that would be authorized. For example, the purchase may be expected to cost $50.00 and, accordingly, the customer may set the maximum authorized amount to, say, $100.00. Proper preauthorization parameters may be empirically or statistically developed and the system may be set accordingly.

The process flow may be best understood by reference to a realistic example in a restaurant environment: The server has presented the customer a check, the customer has briefly reviewed the check, found the total amount of, say, $40.00 agreeable, and handed the server the check and the credit card. The server then moves to a backroom and processes the transaction, by swiping the card and entering the amount of $40.00 into a register terminal. Immediately upon receiving the authorization request, the credit card authorization system (e.g., the acquirer 6) sends an SMS message to the customer's cell phone. The customer receives the message telling him that the restaurant has requested authorization for a charge of $40.00. This happens well before the server returns with the transaction slip requesting the customer's signature.

When the final transaction is posted—the customer may have added a tip and the actual total may come out to, say, $48.00—the customer may or may not be notified again. This depends on the profile associated with the customer.

In the foregoing scenario, unfortunately, the customer's credit card is less than safe. It is possible, for example, for the server to swipe the card for one or two additional transactions, to be posted the next day or the next week. With the invention, the additionally swiped transactions would not be authorized, because the customer would decline. If only notification were requested according to the profile, the customer would still be alerted to the questionable transaction and could thus take the necessary countermeasure steps. Still in the same scenario, the credit card number and the name could be copied down very quickly. In addition, the three-digit security code could be copied down as well. The customer's credit card, while physically long returned to the customer, could now be used to make online and telephone purchases.

It will be understood that the foregoing scenario is merely exemplary and is in no way limiting with regard to the application of the instant invention (nor is it intended to be disparaging to the restaurant industry). Indeed, there exist numerous situations where proper customer notification and customer authorization may prevent fraudulent transactions and even wrongful transactions that are based on honest mistakes.

It will also be understood that the foregoing description is not only applicable to credit card processing, but also to debit and ATM card processing. The term "charge card" encompasses all of these cards and equivalent or similar payment mechanisms. For example, if cash is requested at an ATM (automated teller machine), the customer may be prompted to authorize the dispensing of the given amount via his cell phone, in addition to entering the PIN at the ATM terminal. In a further modification, however, it is possible to dispense with the prompt for the PIN entry at the terminal altogether and to only require the entry of a PIN through the customer's cell phone.

This leads to yet another modification or, rather, to a further application of the novel system according to the invention. It is possible for the customer profile to be set to notify (and/or require confirmation from) a third party. Such third party notification/confirmation may be beneficial in a parent/child relationship, or in an employer/employee relationship. The cell phone (or beeper, or equivalent wireless device) to which the notification is to be sent is set by the cardholder and it may be freely changed through secure access (e.g., by telephone through customer service, online through the Internet).

Figure 2:
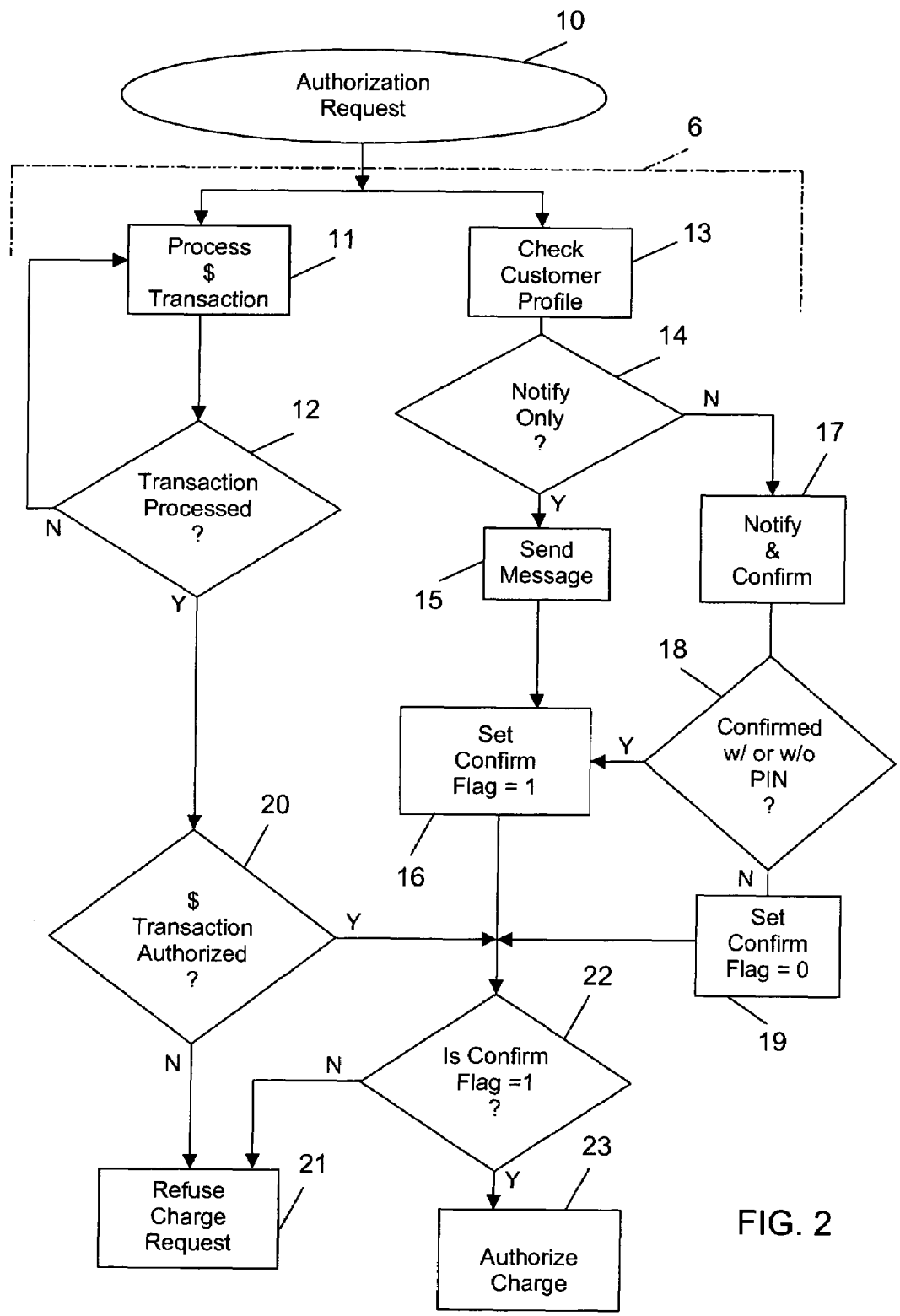
FIG. 2 is a flow diagram illustrating a method for charge request processing according to the invention.

Referring now briefly to FIG. 2, after the required information has been gathered at the merchant's (POS, ATM, online, telephone, etc.), an authorization request or charge request 10 is sent to the financial processing facility 6. There, the request is processed in a conventional manner as indicated by the boxes 11 and 12. At the same time, the customer profile associated with the account number is checked at 13. The customer profile may be set to "no action" or it may not be set at all. In that case, the right-hand branch is immediately terminated. If the profile is set to Notify Only, the query 14 returns a corresponding response and the customer's wireless device (e.g., cell phone or beeper) is notified at 15. The message may be an SMS message or it may be a voice announcement, depending on the customer profile. Once the notification has been sent at 15, a flag is set at 16.

If the customer profile is set to Notify & Confirm, the message to the customer's wireless device contains a message as above and a prompt for confirmation at 17. The confirmation may be a simple reply to an SMS message, it may consist of any key depressed (during a live call), or it may be a full fledged PIN or password. In a further modification, which adds yet another level of security, the customer may be prompted for a voice reply and the reply may then be subjected to "voice recognition" by comparing a frequency hysteresis chart associated with the customer to the voice reply.

If the customer (or the person in the possession of the wireless device) returns the proper response, the query 18 directs the process flow to the box 16, where the confirm flag is once more set to "1." If no response is received, or if an incorrect response is received, the confirm flag is set to "0" at 19.

At approximately the same time as the confirm flag is set to "1" or "0"—signifying proper or improper notification and/or proper customer side authorization—the financial transaction processing also has reached an end point at 20. If the transaction has been rejected, the merchant is notified accordingly by refusing the transaction at 21. If the financial transaction has been authorized at 20, the process queries whether or not the confirm flag has been set ("1") to indicate that the customer has been notified of the transaction and/or has authorized the transaction at 22. If the flag is not set ("0"), the transaction at the merchant's is refused. If the flag is set, the charge is authorized.

We claim:

1. A payment authorization method, which comprises: gathering, at a merchant's, account information for payment of a customer's purchase;
    transmitting an authorization request to a financial authorization system requesting payment authorization for the customer's purchase via a first transmission channel;
    notifying the customer that the authorization request has been received by transmitting, via a second transmission channel independent of and separate from the first transmission channel between the merchant's and the financial institution, a notification to a communications device associated with the customer; and
    processing the transaction for payment authorization substantially without requiring a direct communications link between the communications device associated with the customer and the merchant's and substantially without requiring a response to the notification from the communications device associated with the customer.

2. The method according to claim 1, wherein the authorization request includes the account information and a monetary amount, and the notification to the communications device associated with the customer includes the monetary amount.

3. In a charge card payment authorization method, wherein a charge is requested at a merchant's, account information for payment of a customer's purchase is acquired at the merchant's, an authorization request is transmitted from a terminal associated with the merchant's to a remote charge processing facility, and the charge request is processed, the improvement which comprises: processing the charge request substantially exclusively through communication between the merchant's and the remote processing facility and substantially without requiring activity on the part of the customer, and transmitting a notification of the charge request to a wireless device associated with the customer no later than immediately after authorizing the charge request.

4. The method according to claim 3, which comprises transmitting the notification immediately upon receiving the charge request and prior to authorizing the charge request.

* * * * *